(12) United States Patent
Gu et al.

(10) Patent No.: US 10,302,411 B2
(45) Date of Patent: May 28, 2019

(54) CLOSED-LOOP INTERFEROMETRIC SENSOR USING LOOP GAIN FOR DETERMINING INTERFERENCE CONTRAST

(71) Applicant: ABB Schweiz AG, Baden (CH)

(72) Inventors: Xun Gu, Neuenhof (CH); Sergio Vincenzo Marchese, Zurich (CH); Klaus Bohnert, Oberrohrdorf (CH)

(73) Assignee: ABB Schweiz AG, Baden (CH)

( * ) Notice: Subject to any disclaimer, the term of this patent is extended or adjusted under 35 U.S.C. 154(b) by 5 days.

(21) Appl. No.: 15/696,095

(22) Filed: Sep. 5, 2017

(65) Prior Publication Data

US 2018/0066932 A1 Mar. 8, 2018

(30) Foreign Application Priority Data

Sep. 2, 2016 (EP) .................................. 16187126

(51) Int. Cl.
*G01B 9/02* (2006.01)
*G01D 5/26* (2006.01)
*G01J 9/02* (2006.01)

(52) U.S. Cl.
CPC ......... *G01B 9/02067* (2013.01); *G01D 5/266* (2013.01); *G01J 2009/0253* (2013.01)

(58) Field of Classification Search
CPC .............................. G01B 9/02067; G01D 5/266
See application file for complete search history.

(56) References Cited

U.S. PATENT DOCUMENTS

| 5,477,323 A | * 12/1995 | Andrews | G01D 5/266 356/477 |
| 5,513,003 A | * 4/1996 | Morgan | G01C 19/726 356/464 |
| 6,078,706 A | * 6/2000 | Nau | G01D 5/35303 356/35.5 |

FOREIGN PATENT DOCUMENTS

| CN | 102981136 A | 3/2013 |
| EP | 1231454 A2 | 8/2002 |
| WO | 2015124678 A1 | 8/2015 |

OTHER PUBLICATIONS

European Patent Office, Search Report in corresponding application 16187126.4, dated Feb. 14, 2017, 5 pages.

\* cited by examiner

*Primary Examiner* — Tri T Ton
*Assistant Examiner* — Rufus L Phillips
(74) *Attorney, Agent, or Firm* — Taft Stettinius & Hollister LLP; J. Bruce Schelkopf

(57) ABSTRACT

In order to measure the contrast of interference in an interference-based, closed-loop, phase-modulating optical sensor device, the gain of the feedback loop in a feedback controller is evaluated. This gain is found to be a measure for the contrast. The contrast evaluated in this way can e.g. be used for period-disambiguation when determining the measurand of the sensor device. The sensor device can e.g. be a high-voltage sensor or a current sensor.

20 Claims, 2 Drawing Sheets

CLOSED-LOOP INTERFEROMETRIC SENSOR USING LOOP GAIN FOR DETERMINING INTERFERENCE CONTRAST

FIELD OF THE INVENTION

The invention relates to a method for measuring the interference contrast in an interference-based, closed-loop, phase-modulating optical sensor device. The invention also relates to such an interference-based, closed-loop, phase-modulating optical sensor device.

In this context, an "interference-based, closed-loop, phase-modulating optical sensor device" is a sensor device that is adapted to measure a measurand by means of the optical interference between a first and a second wave, at least one of which has passed a sensing element. It comprises a phase modulator for changing the phase shift between the two waves as well as a light sensor for determining a measured signal from the interference of the waves. The feedback controller maintains the measured signal at a given reference value by controlling the phase modulator.

BACKGROUND OF THE INVENTION

A key issue for wide-range optical DC voltage sensing based on interferometric measurements is how to uniquely determine the voltage-induced electro-optic phase shift across many $2\pi$ periods. To that end, we have demonstrated in a previous patent application [1] an interference-contrast-based method, which works well for a voltage range beyond ±500 kV.

Modulation phase detection (MPD) [2] is a powerful interrogation technique to measure phase shift in an optical system. With this technique, a high-frequency phase modulation waveform is superposed onto the phase shift to be measured. This phase shift can then be derived from the measurement of the polarimetric optical response waveform. A great advantage of the MPD technique is that, because the phase shift of interest is calculated from the shape of the polarimetric response waveform rather than an absolute signal amplitude, the measurement (and particularly its zero-point stability) is in principle not affected by optical power fluctuation or loss variation. Compared to traditional polarimetric phase measurement techniques, MPD enjoys superior accuracy, DC stability and robustness.

Typically, MPD sensors are implemented in a reciprocal configuration, either in the form of a Sagnac interferometer or in a reflective form, in order to cancel phase shifts from additional birefringent elements in the system (such as PM fibers or the phase modulator crystal), which may drift slowly, e.g. with temperature change or mechanical disturbance. Such reciprocal MPD schemes are usually termed "non-reciprocal phase modulation", because the non-reciprocal imposed phase modulation and the phase shift to be measured are the only phase shifts that remain in the measured signal. The reciprocal MPD schemes have seen wide adoption in fiber-optic gyroscopes [2], and later in fiber-optic current sensors (FOCS) [3, 4]. Recently, we have shown that a non-reciprocal form of MPD, namely differential MPD [5], can also be used to achieve similar performance, which is of great benefit for applications requiring a bulk optic sensing element.

The MPD technique can be utilized for optical voltage sensing [6], where the differential electro-optic phase shift between two orthogonally polarized light waves in a Pockels crystal is measured to determine the applied voltage. In cases where the required voltage range is larger than the n-voltage of the sensing crystal, we have shown that one may disambiguate the phase shift periods by measuring the interference contrast in addition [1], which varies as a function of the group delay (and equivalently the phase shift) between the two polarized light waves within the coherence range of a low-coherence light source. The combination of the phase shift principal value and the interference contrast allows the unambiguous determination of the electro-optic phase shift in many $2\pi$ periods, covering a voltage range >±500 kV. As an example [1], we have shown that in an open-loop sinusoidal-wave MPD scheme, the interference contrast may be determined by measuring the DC level of the optical response.

Most commercial MPD sensors use square-wave modulation with closed-loop control and the scheme taught by [1] is not applicable to such systems.

SUMMARY OF THE INVENTION

Therefore, the problem to be solved is to provide a method and device of the closed-loop type mentioned above that allow to measure the interference contrast or to measure a value depending on this interference contrast.

This problem is solved by the method and device of the independent claims. Embodiments are given by dependent claims, their combinations and the description together with the drawings.

In particular, the method comprises the steps of:

Generating a first and a second optical wave by means of a light source: This is the light to be used for probing the sensing element.

Sending at least said first wave through a sensing element, wherein at least one refractive index of said sensing element depends on a measurand: In this way, a measurand-dependent phase shift is generated between the two waves. Advantageously, both waves are sent through the sensing elements, but under different polarizations. Even more advantageously, the waves are reflected back into the sensing element in order to pass it twice.

Sending said first and/or said second wave through a phase modulator for adding a phase shift or phase shift modulation $\phi_m$ between said first and second wave, wherein said phase shift modulation $\phi_m$ is controlled by a control signal $\phi_f$: This phase shift modulation $\phi_m$ adds to the measurand-dependent phase shift generated by the sensing element.

Bringing said first and said second waves to interference (after they have passed the sensing element and the phase modulator at least once) and determining a measured interference signal (I) in a light sensor: The interference signal depends at least quasi-periodically on the phase shift between the said first and second waves.

Using the modulation amplitude of said measured signal (I) due to the phase modulator for determining an error signal $\Delta I$.

Feeding said error signal $\Delta I$ to a feedback loop for generating said control signal $\phi_f$, wherein the feedback loop strives to keep the error signal $\Delta I$ zero with a feedback loop gain G. To achieve optimal responsiveness and stability of the feedback control, the ideal feedback loop gain is to be set as $$G = \frac{\partial \phi_f}{\partial \Delta I}\bigg|_{\Delta I=0}$$

and is so adjusted in order to keep the feedback control system operating in the said optimal condition.

Further, the method comprises the step of using said gain G for determining the interference contrast of said waves.

In another aspect, the invention relates to an interference-based closed-loop, phase-modulating optical sensor device comprising:

A control unit: This is a unit controlling the operations of the device. In an advantageous embodiment, the control unit is adapted and structured to carry out one or more of the steps of the method described herein.

A light source for generating a first and a second optical wave: This is again the light for probing the sensing element.

A sensing element having at least one refractive index depending on a measurand, wherein said light source is positioned to send at least said first wave through said sensing element: In this way, a measurand-dependent phase shift is generated between the two waves. The sensing element can e.g. be a Pockels-effect electro-optic crystal.

A phase modulator adapted and structured to add a phase shift modulation $\phi_m$ between said first and second wave, wherein said phase shift modulation $\phi_m$ is controlled by a control signal $\phi_f$: This phase shift modulation $\phi_m$ adds to the phase shift generated by the sensing element.

A light sensor adapted and structured to determine a measured signal from an interference of said first and said second wave after passage through said sensing element and said phase modulator: In this way, a signal depending almost periodically on the phase shift between the two waves can be derived.

A feedback controller adapted and structured to use the modulated amplitude of the said interference signal for determining an error signal $\Delta I$ and to generate said control signal $\phi_f$, wherein said feedback controller has an optimal gain G $$G = \frac{\partial \phi_f}{\partial \Delta I}\bigg|_{\Delta I=0}.$$

Such a feedback controller strives to keep the error signal zero with the gain adjusted for optimal stability and responsiveness.

Further, the control unit is adapted and structured to use the optimal gain G for determining the interference contrast of the waves.

The invention is based on the understanding that the optimal gain G is a function of the interference contrast of the waves at the light sensor, i.e. the interference contrast can be determined from the optimal gain G.

In this context, the expression "determining an interference contrast" is to be understood such that the interference contrast is determined either explicitly, or that a quantity depending on the interference contrast is determined.

Advantageously, a phase modulation $\phi_m$ between two levels $\phi_\pm = \pm \phi_{m0} + \phi_f$ is generated. In this case, $\phi_f$ is an offset controlled by a control signal. Advantageously, $\phi_{m0} = \pi/2$.

In this case, the amplitude of the interference signal under modulation $\Delta I = I_- - I_+$ is measured, wherein $I_+$ and $I_-$ are the interference signal levels at modulated phase levels $\phi_\pm$, respectively. This signal $\Delta I$ is used as the error signal to be kept zero by the control system.

Advantageously, the sensor device comprises a voltage driver to the phase modulator, generating the above-mentioned phase modulation.

In an advantageous embodiment, the optimal gain G can be used for calculating said measurand.

In particular, in interferometric optical sensor devices the measured signal is often a quasi-periodic function of the measurand. In this context, "quasi-periodic" and "quasi-periodicity" are understood to describe that the measured signal is a periodic function of the measurand, with the exception that its oscillation amplitude (i.e. interference contrast) varies, in particular due to the limited coherence length of the light source. Hence, the optimal gain G can be used for a disambiguation of the quasi-periodicity of the measured signal, as e.g. taught in [1].

In a particularly advantageous embodiment, the invention can be used for sensing a voltage. In that case, the said measurand is said electrical voltage. The sensing element is located in an electrical field generated by the electrical voltage. And the at least one refractive index of the sensing element depends on the electrical field, i.e. the sensing element is an electro-optic sensing element, in particular a crystal exhibiting the Pockels effect wherein the linear birefringence of the material is a linear function of the applied electrical field.

The invention is particularly suited to measure high voltages of at least 100 kV, in particular of at least 500 kV. It can advantageously be used for DC voltages. But it can also be used for measuring AC voltages.

The invention is ideal for various HVDC applications, including HVDC Light, HVDC Classic, and offshore DC applications, e.g. in a direct-current gas-insulated substation (DC GIS).

In another advantageous embodiment, the invention can be used for sensing an electrical current. In that case, the measurand is said electrical current. The sensing element is located in a magnetic field generated by the electrical current. And at least one refractive index of the sensing element depends on the magnetic field, e.g, the sensing element is a magneto-optic sensing element, in particular a fiber wound around a conductor carrying the current, wherein the circular birefringence is a linear function of the magnetic field.

In yet another advantageous embodiment, the invention can be used for sensing acceleration in an optical gyroscope.

The gain can e.g. be determined by intermittently measuring a response of the measured interference signal amplitude to a variation of the control signal $\phi_f$. The term "intermittently" is in this case advantageously to be understood as a periodic or non-periodic occurrence of this determination step, while a normal operation of the control loop takes place between the determination steps.

In another advantageous embodiment, the invention relates to a method, wherein the determined optimal gain G is used to correct systematic errors, in particular due to drift and/or component misalignment, in the sensor device, in particular in optical voltage sensing.

The invention shows that it is possible to use the feedback loop gain of e.g. a closed-loop square-wave MPD system to determine the interference contrast, without additional hardware. The ability to measure the interference contrast e.g. enables to extend the unambiguous phase shift measurement range beyond 2π, which is of vital importance for some applications, such as optical DC voltage measurement. The invention can also be used to monitor PER (polarization extinction ratio) variation and to correct for corresponding changes in the current measurement scale factor in a FOCS system.

The invention demonstrates that, without any additional hardware, the interference contrast can be readily determined in a MPD detection scheme from the loop gain, which is continuously measured in the current ABB system for operation regulation.

In conjunction with the interference-contrast-based period disambiguation method e.g. as described in [1], this invention provides the core technology enabling optical DC voltage sensing in a wide voltage range.

Particular advantages of the closed-loop square-wave modulation phase detection (MPD) scheme are the excellent scale factor and zero point stabilities, both of which are needed for the accurate measurement of a DC voltage. The invention demonstrates that, without any additional hardware, the interference contrast can be readily determined in a MPD detection scheme from the loop gain, which is continuously measured by the control system for operation regulation. In conjunction with the interference-contrast-based period disambiguation method, this invention provides the core technology enabling optical DC voltage sensing in a wide voltage range.

The measurement of the interference contrast with closed-loop MPD is also beneficial to the further improvement of sensing systems, where the measurement scale factor is sensitive to the polarization extinction ratio (PER) of the fiber link. PER changes, e.g. due to changes in fiber connector properties, are directly reflected in the interference contrast; therefore, monitoring the interference contrast provides a way to control and compensate such systematic errors of scale factor variations, which is important for maintaining high measurement accuracy over long time and a wide temperature range.

BRIEF DESCRIPTION OF THE FIGURES

The invention will be better understood and objects other than those set forth above will become apparent when consideration is given to the following detailed description thereof. This description makes reference to the annexed drawings, wherein.

DETAILED DESCRIPTION

Figure 1:
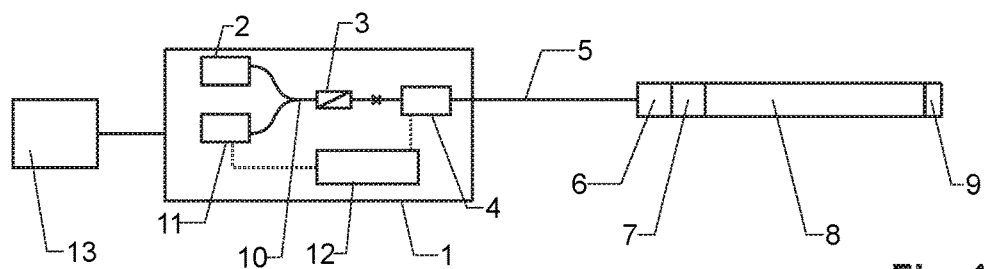
FIG. 1 shows a block diagram of a reflective optical voltage sensor with closed-loop MPD.

The design of a reflective optical voltage sensor using the closed-loop MPD phase shift detection scheme is shown in FIG. 1.

The device comprises an MPD optoelectronics module 1, which contains a low-coherence light source 2. The light from light source 2 is fed through a polarizer 3, a phase modulator 4 and into both polarization directions of a polarization maintaining (PM) fiber 5.

A collimator 6 sends these waves from PM fiber 5 through a 45° Faraday rotator 7 and into a first end of Pockels effect crystal 8, which is being exposed to the electrical field generated by the voltage to be measured. At the second end of the crystal, the waves are reflected by reflector 9 and sent back through the components 3-8.

A beam splitter 10 is arranged between light source 2 and polarizer 3 and sends at least part of the returning light into a light sensor 11.

The device of FIG. 1 further comprises a feedback controller 12 for controlling phase modulator 4 as well as a control unit 13 for controlling the operations of the device. These two components, whose functions are described in more detail below, can be implemented as a single hardware unit (such as a microcontroller) or as separate hardware units.

Faraday rotator 6 rotates both linear polarizations from PM fiber 5 by 45° before they propagate along the electro-optic axes (principal refractive index axes) of sensing crystal 8. The reflected waves pass through Faraday rotator 6 again, further rotating the polarizations by 45° in the same direction, thereby making a combined 90° rotation from the input polarizations, which is equivalent to a swap between the two orthogonal linear polarizations.

Phase modulator 4 is operating at a frequency adapted to the round-trip time of the light waves traveling from modulator 4 to reflector 9 and back, such that the relative phase shifts induced by the phase modulator in the two passes of the waves through it have opposite signs and the phase modulations in the two passes are consequently added due to the swap in light polarizations.

The coherence length of light source 2 is advantageously between $5 \cdot \lambda_0$ and $100 \cdot \lambda_0$, with $\lambda_0$ being the center wavelength of the light source, in order to obtain a good variation of interference contrast A when changing the phase between the two polarizations by a few multiples of 2π.

Figure 2A:
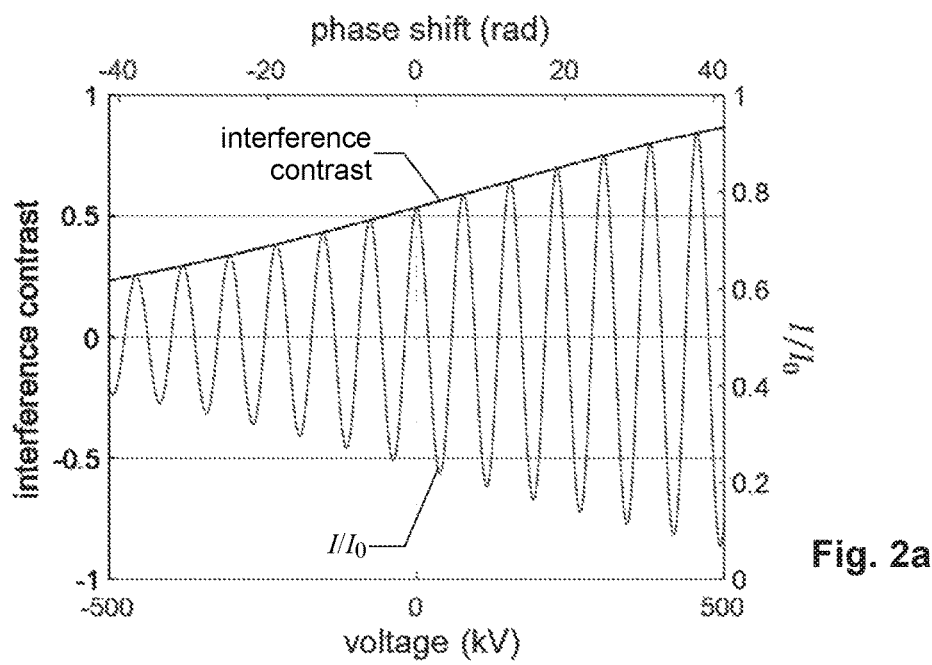
FIG. 2a shows the interference contrast A and unmodulated optical power I as functions of the applied voltage and the corresponding phase shift.

With such a low-coherence light source 1 and a properly selected group delay offset $\tau_0$ (e.g. by means of a birefringent element), the voltage measurement range can be set such that the interference contrast varies strongly and monotonically with the applied voltage (see FIG. 2a), thereby enabling the unambiguous determination of the voltage in a wide measurement range (>±500 kV).

In the MPD system, a phase modulation $\phi_m(t)$ is added in phase modulator 4 onto a phase shift of interest ($\phi_0$), i.e. here the phase shift caused by the measurand, and the polarimetric optical response is measured in the returning waves after they have passed polarizer 3. This response is the intensity I of the interfering waves $$I(t) = \frac{I_0}{2}\{1 + A\cos[\phi_0 + \phi_m(t)]\},$$

where $I_0$ is the total light power, and A is the interference contrast.

In a closed-loop square-wave modulation system, the modulation $\phi_m(t)$ is advantageously a square wave alternating between two levels $\phi_\pm = \pm\pi/2 + \phi_f$, where $\phi_f$ is a dynamically controlled feedback phase [2]. $\phi_f$ can be considered to be the control signal that feedback controller 12 uses for controlling phase modulator 4.

The corresponding measured polarimetric response at the two modulation levels are $$I_\pm = \frac{I_0}{2}[1 \mp A\sin(\phi_0 + \phi_f)]$$

The feedback-loop error signal is the difference between the two polarimetric response levels $$\Delta I = I_- - I_+ = \Delta I_0 \sin(\phi_0 + \phi_f)$$

Figure 2B:
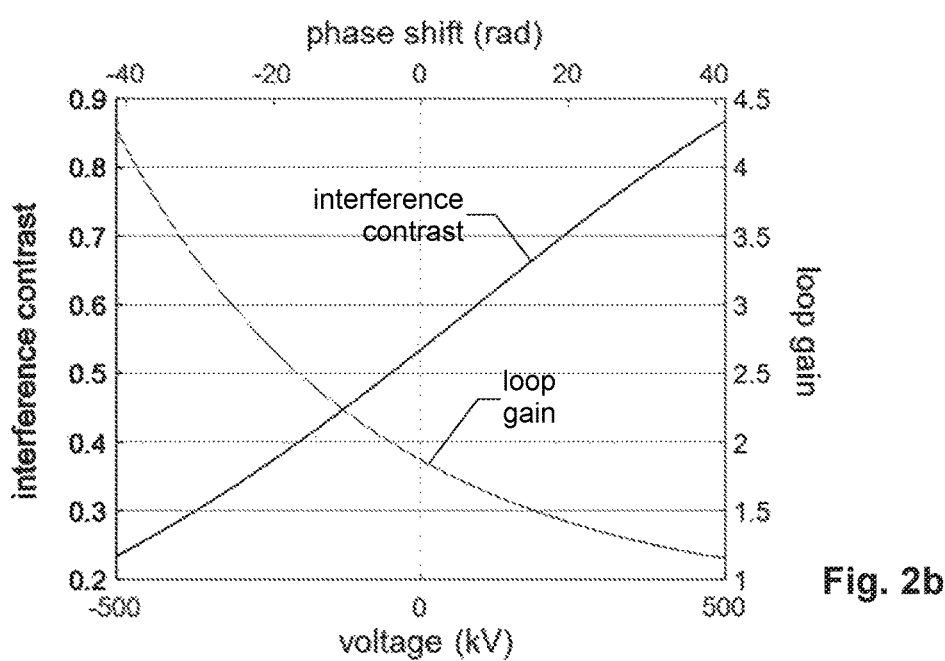
FIG. 2b shows the interference contrast A and expected loop gain G; the calculation for FIGS. 2a, 2b is performed for a reflective BGO voltage sensor, with a 40 nm FWHM Gaussian spectrum centered at 1310 nm, and a group delay offset $\tau_0 = -60$ fs, assuming $I_0 = 1$ for loop gain.

The system is operated at a point that the error signal $\Delta I$ is maintained at 0, which corresponds to $\phi_0 + \phi_f = 0$. Therefore, at the operating point, the phase shift offset to be measured $\phi_0$ is simply the opposite of the dynamically controlled feedback phase shift $\phi_f$. The expected loop gain in the designed voltage range is plotted in FIG. 2b.

The optimal loop gain of the feedback loop in feedback controller 12 is found to be the derivative of the feedback phase shift with respect to the error signal at the set point, i.e.

$$G = \left.\frac{\partial \phi_f}{\partial \Delta I}\right|_{\Delta I=0} = \frac{1}{AI_0}$$

As an important control parameter for the control loop, the optimal loop gain G is determined by control unit 13 e.g. in the following way. Intermittently, in particular periodically (but possibly also in non-periodic manner), the response of the measured signal, in particular the response of the error signal $\Delta I$, to a variation of the control signal $\phi_f$ applied to the phase modulator 12 is measured.

Figure 3:
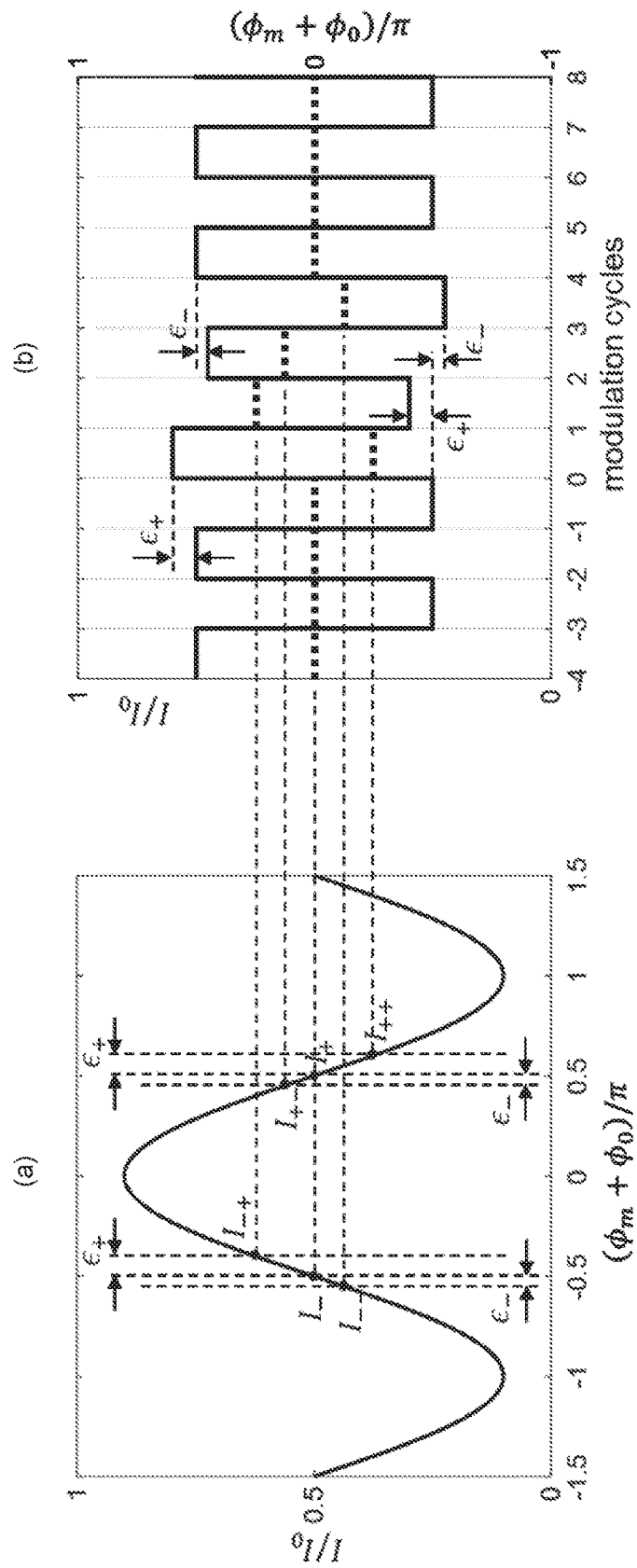
FIG. 3 shows, in part (a), the polarimetric response curve and, in part (b), the square-wave modulation waveforms of phase shift $\phi_m$-$\phi_f$ (dotted) and polarimetric output I (dashed) at the set point; for the plots, we assume $\in_+ = 0.1\pi$ and $\in_- = 0.05\pi$; the loop-gain calculation sequence occupies modulation cycles 0 to 3.

For example, a phase modulation sequence $[\phi_{++}, \phi_{-+}, \phi_{+-}, \phi_{--}]$ is invoked, whereby small phase deviations $\epsilon_\pm$ (typically $\epsilon_+ = \epsilon_-$) are added to or subtracted from the normal phase modulation $\phi_\pm$ (see FIG. 3):

$$\phi_{++} = \phi_+ + \epsilon_+ = \frac{\pi}{2} + \phi_{f0} + \epsilon_+$$

$$\phi_{-+} = \phi_- + \epsilon_+ = -\frac{\pi}{2} + \phi_{f0} + \epsilon_+$$

$$\phi_{+-} = \phi_+ - \epsilon_- = \frac{\pi}{2} + \phi_{f0} - \epsilon_-$$

$$\phi_{--} = \phi_- - \epsilon_- = -\frac{\pi}{2} + \phi_{f0} - \epsilon_-$$

Here, $\phi_{f0}$ corresponds to the control signal $\phi_f$ that presently sets the error signal $\Delta I$ to zero.

Correspondingly, the polarimetric responses at the four modulation levels are $$I_{++} = \frac{I_0}{2}(1 - A\sin\epsilon_+) \approx \frac{I_0}{2}(1 - A\epsilon_+)$$

$$I_{-+} = \frac{I_0}{2}(1 + A\sin\epsilon_+) \approx \frac{I_0}{2}(1 + A\epsilon_+)$$

$$I_{+-} = \frac{I_0}{2}(1 + A\sin\epsilon_-) \approx \frac{I_0}{2}(1 + A\epsilon_-)$$

$$I_{--} = \frac{I_0}{2}(1 - A\sin\epsilon_-) \approx \frac{I_0}{2}(1 - A\epsilon_-)$$

From these, we can calculate two error signals corresponding to $\epsilon_\pm$ as $$\Delta I_+ = I_{-+} - I_{++} = AI_0 \epsilon_+$$

$$\Delta I_- = I_{--} - I_{+-} = -AI_0 \epsilon_-$$

The optimal loop gain can then be calculated as $$G = \frac{\epsilon_+ + \epsilon_-}{\Delta I_+ - \Delta I_-} = \frac{1}{AI_0}$$

The calculated optimal loop gain G is then used for setting the amplitude of the feedback phase shift.

From the results above, one sees that the loop gain value G measured in the MPD system is related to the interference contrast A and the total light power $I_0$. Conversely, one can calculate the interference contrast A as $$A = \frac{1}{GI_0}$$

In the modulation scheme described above, the total light power $I_0$ is just twice the optical response level $I_\pm$ at the operating point $\phi_0 + \phi_f = 0$. Therefore, practically it can be measured as the DC offset of the optical response $I_\pm$, while the AC oscillation amplitude $\Delta I$ is used as the error signal to control the feedback loop.

It should however be noted, that in some applications, such as period disambiguation of the phase shift (e.g. for optical DC current sensing), it is not necessary to determine the absolute value of the interference contrast A, but it would be sufficient to follow its relative change. In such cases, one may record the relative variations of the loop gain G and the total optical power $I_0$, without determining their absolute scales. For example, one may set the values of the loop gain and the total optical power measured at a certain moment (e.g. at the onset of operation) to a constant, and evaluate all subsequent measurements accordingly. If the optical power is maintained at a constant level, its measurement may not be needed at all.

With the interference contrast A measured, one can then determine, in which period the phase shift is residing, and convert the measured phase shift principal value to a corresponding unique full-range value, following the procedure that is described in [1], the disclosure of which is herewith enclosed in its entirety. For an optical voltage sensor, an unambiguous voltage value can then be calculated from the full-range phase shift.

In a FOCS sensor, the interference contrast calculated from the loop gain can likewise be used to extend the measurement range, which is, without history tracking, limited to $2\pi$ phase shift in current products.

Furthermore in some FOCS sensors, the current measurement scale factor is influenced by the polarization extinction ratio of the fiber link between the sensor head and the optoelectronics, which in turn directly affects the interference contrast. Therefore, the measurement of the interference contrast can be used to monitor the variation of the polarization extinction ratio, and to compensate the corresponding variation of the current measurement scale factor. Hence, also in this case, the interference contrast can be used to determine the measurand in a more precise manner.

In general, the determined gain G can be used to correct systematic errors, in particular systematic errors due to drift and/or component misalignment, in the sensor device, in particular if the systematic errors affect the interference contrast.

Notes:

Electro-optic crystal 5 can be replaced by any other electro-optic element that exhibits a birefringence depending on the applied electrical field.

In another application for measuring the current in a conductor, the sensing element can e.g. be a fiber wound around the conductor. In that case, a quarter-wave retarder is used instead of Faraday rotator 7.

Advantageously, the optical sensor device has a reciprocal configuration, e.g. in the form of a Sagnac interferometer or in a reflective form, where the phase shifts, in particular from PM fiber 5 and/or sensing element 8, are canceled. In that case, the phase modulator 4 is advantageously operated, as mentioned, to apply opposing phase shifts between the two waves at a frequency corresponding to a round trip from the modulator 4 to reflector 9 and back.

When the device is a voltage sensor, the techniques shown herein allow the compensation of systematic errors for an optical DC voltage sensor with measurement range >±500 kV to achieve an accuracy <0.2%.

The techniques are ideal for applications in HVDC air-insulated systems, HVDC cables, and DC gas-insulated switching (GIS) systems. Such GIS may be filled with dielectric gas based on SF6 or alternative gases, such as fluoroketones or fluoronitriles, preferably in mixtures with a background gas, such as e.g. selected from: nitrogen, carbon dioxide and oxygen.

They allow to remove the periodwise measurement ambiguity in a wide range (>16 phase periods, or equivalently >±500 kV).

They provide a means for the measurement of interference contrast in a closed-loop modulation phase detection system for ambiguity removal.

And they make it also possible to enhance the accuracy of fiber-optic current sensors (monitor and control of polarization extinction ratio, PER) by correction of variations in scale factor during operation While presently preferred embodiments of the invention are shown and described, it is to be distinctly understood that the invention is not limited thereto but may be otherwise variously embodied and practiced within the scope of the following claims.

REFERENCES CITED

[1] WO 2015/124676
[2] H. Lefévre, *The Fiber-Optic Gyroscope*: Artech House, 1993.
[3] K. Bohnert, P. Gabus, J. Nehring, and H. Brändle, "Temperature and vibration insensitive fiber-optic current sensor," *Journal of Lightwave Technology*, vol. 20, pp. 267-276, 2002.
[4] K. Bohnert, P. Gabus, J. Nehring, H. Brändle, and M. G. Brunzel, "Fiber-Optic Current Sensor for Electro-winning of Metals," *J. Lightwave Technol.*, vol. 25, pp. 3602-3609, 2007.
[5] WO 2015/124678
[6] U.S. Pat. No. 7,911,196

LIST OF REFERENCE NUMBERS

1: optoelectronics module
2: light source
3: polarizer
4: phase modulator
5: fiber
6: collimator
7: Faraday rotator
8: Pockels effect crystal 8
9: reflector
10: beam splitter
11: light sensor
12: feedback controller
13: control unit

The invention claimed is:

1. A method for measuring an interference contrast (A) in an interference-based, closed-loop, phase-modulating optical sensor device, said method comprising the steps of
generating a first and a second optical wave by means of a light source,
sending at least said first wave through a sensing element, wherein at least one refractive index of said sensing element depends on a measure,
sending said first and/or said second wave through a phase modulator for adding a phase shift modulation ϕm between said first and second wave, wherein said phase shift modulation ϕm is controlled by a control signal ϕf,
bringing said first and said second waves to interference and determining a measured interference signal (I) in a light sensor,
using a modulation amplitude of said measured signal (I) for determining an error signal ΔI and feeding said error signal ΔI to a feedback loop for controlling said phase shift modulation ϕm, wherein said feedback loop controls said control signal ϕf with feedback loop gain G in order to keep said error signal ΔI zero,
adjusting said feedback loop gain G to a value $$G = \frac{\partial \phi_f}{\partial \Delta I}\bigg|_{\Delta I=0},$$

using said gain G for determining the interference contrast (A) of said waves.

2. The method of claim 1, further comprising the step of using said gain G for calculating said measurand.

3. The method of claim 2, comprising the step of using said gain G for a disambiguation of a quasi-periodicity of said measured signal (I) as a function of said measurand.

4. The method of claim 1, wherein said measurand is an electrical voltage, said sensing element is located in an electrical field generated by said electrical voltage, and said at least one refractive index depends on said electrical field.

5. The method of claim 1, wherein said measurand is an electrical current, said sensing element is located in a magnetic field generated by said electrical current, and said at least one refractive index depends on said magnetic field.

6. The method of claim 1, comprising the step of intermittently measuring a response of the measured signal (I) to a variation of said control signal ϕf.

7. The method of claim 1, wherein said gain G is used to correct a systematic error of said sensor device.

8. The method of claim 2, wherein said measurand is an electrical voltage, said sensing element is located in an electrical field generated by said electrical voltage, and said at least one refractive index depends on said electrical field.

9. The method of claim 3, wherein said measurand is an electrical voltage, said sensing element is located in an electrical field generated by said electrical voltage, and said at least one refractive index depends on said electrical field.

10. The method of claim 2, wherein said measurand is an electrical current, said sensing element is located in a magnetic field generated by said electrical current, and said at least one refractive index depends on said magnetic field.

11. The method of claim 3, wherein said measurand is an electrical current, said sensing element is located in a magnetic field generated by said electrical current, and said at least one refractive index depends on said magnetic field.

12. The method of claim 2, comprising the step of intermittently measuring a response of the measured signal (I) to a variation of said control signal ϕf.

13. The method of claim 3, comprising the step of intermittently measuring a response of the measured signal (I) to a variation of said control signal ϕf.

14. The method of claim 4, comprising the step of intermittently measuring a response of the measured signal (I) to a variation of said control signal ϕf.

15. The method of claim 5, comprising the step of intermittently measuring a response of the measured signal (I) to a variation of said control signal ϕf.

16. The method of claim 7, wherein said systematic error of said sensor device is due to drift and/or component misalignment.

17. The method of claim 2, wherein said gain G is used to correct a systematic error of said sensor device.

18. The method of claim 3, wherein said gain G is used to correct a systematic error of said sensor device.

19. An interference-based closed-loop, phase-modulating optical sensor device comprising
a control unit
a light source for generating a first and a second optical wave,
a sensing element having at least one refractive index depending on a measurand, wherein said light source is positioned to send at least said first wave through said sensing element
a phase modulator configured to add a phase shift modulation ϕm between said first and second wave, wherein said phase shift modulation ϕm is controlled by a control signal ϕf,
a light sensor configured to determine a measured signal (I) from an interference of said first and said second wave after passage through said sensing element and said phase modulator,
a feedback controller configured to use the modulated amplitude of said measured signal (I) for determining an error signal ΔI and to generate said control signal ϕf, wherein said feedback controller has an optimum gain G $$G = \frac{\partial \phi_f}{\partial \Delta I}\bigg|_{\Delta I=0},$$

said control unit is configured to use said gain G for determining an interference contrast (A) of said waves.

20. The interference-based closed-loop, phase-modulating optical sensor device of claim 19, wherein said measurand is an electrical voltage, said sensing element is located in an electrical field generated by said electrical voltage, and said at least one refractive index depends on said electrical field.

* * * * *